United States Patent
Eslami

(10) Patent No.: US 9,357,237 B2
(45) Date of Patent: May 31, 2016

(54) IMAGE PROCESSING SYSTEM WITH BITSTREAM REDUCTION AND METHOD OF OPERATION THEREOF

(71) Applicant: Sony Corporation, Tokyo (JP)

(72) Inventor: Ramin Eslami, Milpitas, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/525,364

(22) Filed: Oct. 28, 2014

(65) Prior Publication Data

US 2016/0119651 A1    Apr. 28, 2016

(51) Int. Cl.
G06K 9/36    (2006.01)
H04N 19/91    (2014.01)
H04N 19/176    (2014.01)
H04N 19/18    (2014.01)

(52) U.S. Cl.
CPC ............. *H04N 19/91* (2014.11); *H04N 19/176* (2014.11); *H04N 19/18* (2014.11)

(58) Field of Classification Search
None
See application file for complete search history.

(56) References Cited

U.S. PATENT DOCUMENTS

| | | | |
|---|---|---|---|
| 6,154,493 A | 11/2000 | Acharya et al. | |
| 6,272,180 B1 | 8/2001 | Lei | |
| 6,356,665 B1 | 3/2002 | Lei et al. | |
| 6,546,143 B1 | 4/2003 | Taubman et al. | |
| 6,549,666 B1 | 4/2003 | Schwartz | |
| 6,801,665 B1 | 10/2004 | Atsumi et al. | |
| 6,865,291 B1 | 3/2005 | Zador | |
| 6,965,700 B2 | 11/2005 | Pearlman et al. | |
| 7,006,697 B1 | 2/2006 | Gormish et al. | |
| 7,120,307 B2 | 10/2006 | Malvar | |
| 7,142,722 B2 | 11/2006 | Fukuhara et al. | |
| 7,248,735 B2 | 7/2007 | Funakubo | |
| 7,308,402 B2 | 12/2007 | Zhou et al. | |
| 7,315,651 B2 | 1/2008 | Sakuyama et al. | |
| 7,376,279 B2 | 5/2008 | Dekel et al. | |
| 7,397,963 B2 | 7/2008 | Schwartz | |
| 7,412,102 B2 | 8/2008 | Srinivasan et al. | |
| 7,421,137 B2 | 9/2008 | Taubman | |
| 7,454,074 B2 | 11/2008 | Dekel et al. | |
| 7,492,955 B2 | 2/2009 | Zandi et al. | |
| 7,545,988 B2 | 6/2009 | Meeker | |

(Continued)

FOREIGN PATENT DOCUMENTS

WO    WO-0049571 A2    8/2000

OTHER PUBLICATIONS

U.S. Appl. No. 14/525,474, filed Oct. 28, 2014, Eslami.

(Continued)

*Primary Examiner* — Li Liu

(74) *Attorney, Agent, or Firm* — Haverstock & Owens LLP

(57) ABSTRACT

An image processing system, and a method of operation thereof, includes: a pre-processing module for receiving a raw image block of a source image from an imaging device; a wavelet transform module, coupled to the pre-processing module, for forming a wavelet coefficient block by performing a wavelet transform operation on the raw image block; an encoding module, coupled to the wavelet transform module, for generating an encoded block in a wavelet bitplane based on the wavelet coefficient block, for checking a bitstream length of the encoded block in a coding pass, for generating a header in the encoded block based on the bitstream length, and for generating a bitstream based on the header for decoding into a display image to display on a display device.

20 Claims, 6 Drawing Sheets

(56) References Cited

U.S. PATENT DOCUMENTS

| | | |
|---|---|---|
| 7,574,056 B2 | 8/2009 | Funakubo et al. |
| 7,623,577 B2 | 11/2009 | Kim et al. |
| 7,634,145 B2 | 12/2009 | Keith et al. |
| 7,656,561 B2 | 2/2010 | Molgaard et al. |
| 7,949,044 B2 | 5/2011 | Winger et al. |
| 8,265,334 B2 | 9/2012 | Yoo et al. |
| 8,306,340 B2 | 11/2012 | Ceperkovic et al. |
| 8,351,693 B2 | 1/2013 | Hayashi |
| 8,401,082 B2 | 3/2013 | Ye et al. |
| 8,428,379 B2 | 4/2013 | Rane et al. |
| 8,446,947 B2 | 5/2013 | Yu et al. |
| 8,588,536 B2 | 11/2013 | Dikbas et al. |
| 8,861,879 B2 | 10/2014 | Park et al. |
| 2001/0024530 A1 | 9/2001 | Fukuhara et al. |
| 2002/0003905 A1 | 1/2002 | Sato et al. |
| 2002/0118759 A1* | 8/2002 | Enficiaud ............... H04N 19/70 375/240.19 |
| 2003/0063809 A1* | 4/2003 | Andrew ................. G06T 9/007 382/240 |
| 2003/0123742 A1 | 7/2003 | Zhao et al. |
| 2003/0190042 A1 | 10/2003 | Tagashira et al. |
| 2005/0131660 A1 | 6/2005 | Yadegar et al. |
| 2006/0034525 A1 | 2/2006 | Sakai |
| 2006/0159355 A1 | 7/2006 | Mizuno |
| 2008/0253463 A1 | 10/2008 | Lin et al. |
| 2010/0046628 A1 | 2/2010 | Bhaskaran et al. |
| 2010/0085224 A1 | 4/2010 | Monro |
| 2011/0229047 A1* | 9/2011 | Shimauchi ............. H04N 19/91 382/233 |
| 2011/0292247 A1 | 12/2011 | Gharavi-Alkhansari et al. |
| 2012/0200669 A1 | 8/2012 | Lai et al. |
| 2012/0307904 A1 | 12/2012 | Yi et al. |
| 2014/0169693 A1 | 6/2014 | Kuo et al. |

OTHER PUBLICATIONS

U.S. Appl. No. 14/525,524, filed Oct. 28, 2014, Eslami.
U.S. Appl. No. 14/525,556, filed Oct. 28, 2014, Eslami.
U.S. Appl. No. 14/525,611, filed Oct. 28, 2014, Eslami.
U.S. Appl. No. 14/525,657, filed Oct. 28, 2014, Eslami.
U.S. Appl. No. 14/526,120, filed Oct. 28, 2014, Eslami.
Pearlman et al., Efficient, Low-Complexity Image Coding with a Set-Partitioning Embedded Block Coder, IEEE Transactions on Circuits and Systems for Video Technology, Nov. 2004, pp. 1219-1235, vol. 14, No. 11, Publisher: IEEE.

* cited by examiner

FIG. 3

| | | | | LOWPASS SUBBAND 306 | | | | THIRD HIGHPASS SUBBAND 308 | | | | SEC HIGHPASS SUBBAND 310 | | | | | | | | FIRST HIGHPASS SUBBAND 312 | | | | | | | | | | | | | | | |
|---|---|---|---|---|---|---|---|---|---|---|---|---|---|---|---|---|---|---|---|---|---|---|---|---|---|---|---|---|---|---|---|---|---|
| RAW IMG BLKS 226 → | X | 100 | 100 | 101 | 101 | 101 | 110 | 101 | 105 | 106 | 105 | 104 | 104 | 103 | 103 | 104 | 103 | 104 | 105 | 104 | 104 | 102 | 100 | 96 | 89 | 80 | 72 | 69 | 68 | 67 | 66 | 65 | 65 |
| WAV COEF 216 → | Y | 37 | 40 | 44 | 16 | -1 | -2 | 12 | -15 | 1 | 2 | 0 | -1 | 2 | 6 | -4 | -2 | 0 | 0 | 1 | 0 | -1 | 1 | -1 | 0 | 1 | 1 | 1 | 1 | -2 | 0 | 0 | 0 |
| | INDEX | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |

FIG. 4

WAV COEF BLKS 218, IDX POS 411, BITS 409

| WAV COEF 216 → | y | 37 | 40 | 44 | 16 | -1 | -2 | 12 | -15 | 1 | 2 | 0 | -1 | 2 | 6 | -4 | -2 | 0 | 0 | 1 | 0 | -1 | 1 | -1 | 0 | 1 | 1 | 1 | 1 | -2 | 0 | 0 | 0 |
|---|---|---|---|---|---|---|---|---|---|---|---|---|---|---|---|---|---|---|---|---|---|---|---|---|---|---|---|---|---|---|---|---|---|
| WAV BITP 408 | index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| MOST SIG BITP 404 | n=6 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| HIGHER BITP 410 | n=5 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| CUR BITP 402 | n=4 | 0 | 0 | 1 | 0 | 0 | 0 | 0 | 1 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| LOWER BITP 412 | n=3 | 0 | 1 | 0 | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| | n=2 | 0 | 0 | 0 | 0 | 0 | 1 | 0 | 1 | 0 | 1 | 0 | 0 | 1 | 1 | 0 | 1 | 0 | 0 | 0 | 0 | 0 | 0 | 0 | 0 | 0 | 1 | 1 | 0 | 1 | 1 | 1 | 0 |
| LEAST SIG BITP 406 | n=1 | 1 | 0 | 0 | 0 | 1 | 0 | 0 | 1 | 1 | 0 | 0 | 1 | 0 | 0 | 0 | 0 | 0 | 0 | 1 | 0 | 1 | 1 | 1 | 0 | 1 | 0 | 1 | 0 | 0 | 0 | 0 | 0 |

IMAGE PROCESSING SYSTEM WITH BITSTREAM REDUCTION AND METHOD OF OPERATION THEREOF

CROSS-REFERENCE TO RELATED APPLICATION(S)

The present application contains subject matter related to concurrently filed U.S. patent application Ser. No. 14/525, 474. The related application is assigned to Sony Corporation and the subject matter thereof is incorporated herein by reference thereto.

The present application contains subject matter related to concurrently filed U.S. patent application Ser. No. 14/525, 524. The related application is assigned to Sony Corporation and the subject matter thereof is incorporated herein by reference thereto.

The present application contains subject matter related to concurrently filed U.S. patent application Ser. No. 14/525, 556. The related application is assigned to Sony Corporation and the subject matter thereof is incorporated herein by reference thereto.

The present application contains subject matter related to concurrently filed U.S. patent application Ser. No. 14/526, 611. The related application is assigned to Sony Corporation and the subject matter thereof is incorporated herein by reference thereto.

The present application contains subject matter related to concurrently filed U.S. patent application Ser. No. 14/525, 657. The related application is assigned to Sony Corporation and the subject matter thereof is incorporated herein by reference thereto.

The present application contains subject matter related to concurrently filed U.S. patent application Ser. No. 14/526, 120. The related application is assigned to Sony Corporation and the subject matter thereof is incorporated herein by reference thereto.

TECHNICAL FIELD

The present invention relates generally to an image processing system and more particularly to a system for lossless compression.

BACKGROUND ART

Modern consumer and industrial electronics, especially devices with a graphical imaging capability, such as cameras, televisions, projectors, cellular phones, and combination devices, are providing increasing levels of functionality to support modern life, which require capturing and managing digital image information. Larger image format sizes and recording speeds require ever-larger amounts of information to be digitally stored on digital media to capture images and video recordings. Research and development in the existing technologies can take a myriad of different directions.

As users become more empowered with the growth of imaging devices, new and old paradigms begin to take advantage of this new device space. There are many technological solutions to take advantage of this new imaging opportunity. One existing approach is to capture and display images on consumer, industrial, and mobile electronics such as digital cameras, smart phones with imaging capability, digital projectors, televisions, monitors, gaming systems, video cameras, or a combination devices.

Image capture and display systems have been incorporated in cameras, phones, projectors, televisions, notebooks, and other portable products. Today, these systems aid users by capturing and displaying available relevant information, such as images, graphics, text, or videos. The capture and display of digital images provides invaluable relevant information.

However, capturing, managing, and displaying information in digital images has become a paramount concern for the consumer. Mobile systems must store larger amounts of digital image information in smaller physical storage spaces. Limiting the capture of digital images decreases the benefit of using the tools.

Thus, a need still remains for better image processing system to capture and display digital images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

Embodiments of the present invention provide a method of operation of an image processing system including: receiving a raw image block of a source image from an imaging device; forming a wavelet coefficient block by performing a wavelet transform operation on the raw image block; generating an encoded block in a wavelet bitplane based on the wavelet coefficient block; checking a bitstream length of the encoded block in a coding pass; generating a header in the encoded block based on the bitstream length; and generating a bitstream based on the header for decoding into a display image to display on a display device.

Embodiments of the present invention provide an image processing system, including: a pre-processing module for receiving a raw image block of a source image from an imaging device; a wavelet transform module, coupled to the pre-processing module, for forming a wavelet coefficient block by performing a wavelet transform operation on the raw image block; an encoding module, coupled to the wavelet transform module, for generating an encoded block in a wavelet bitplane based on the wavelet coefficient block, for checking a bitstream length of the encoded block in a coding pass, for generating a header in the encoded block based on the bitstream length, and for generating a bitstream based on the header for decoding into a display image to display on a display device.

Certain embodiments of the invention have other steps or elements in addition to or in place of those mentioned above. The steps or the elements will become apparent to those skilled in the art from a reading of the following detailed description when taken with reference to the accompanying drawings.

BRIEF DESCRIPTION OF THE DRAWINGS

FIG. 3 is an example of the wavelet coefficients.

FIG. 4 is an example of one of the wavelet coefficient blocks.

BEST MODE FOR CARRYING OUT THE INVENTION

Figure 1:
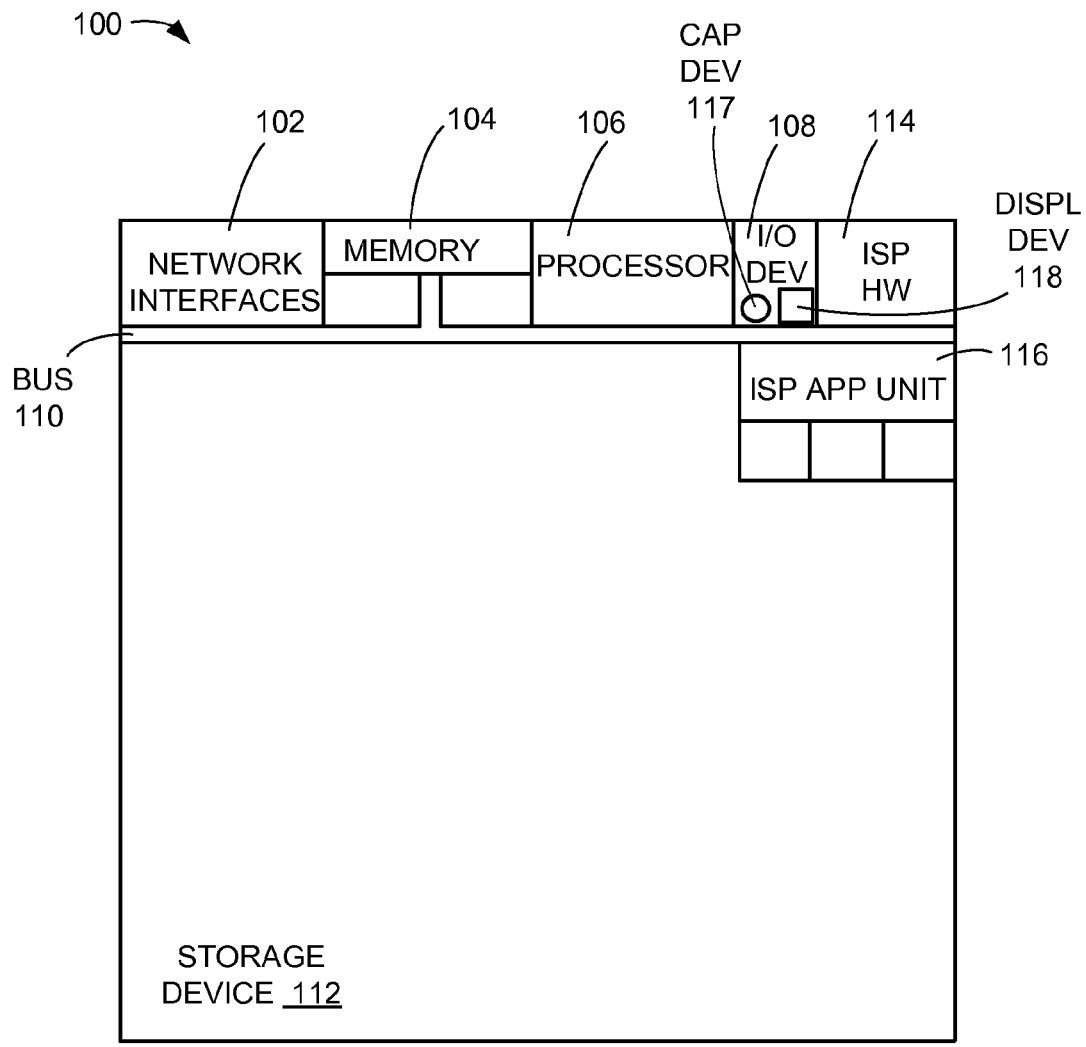
FIG. 1 is an example of a hardware block diagram of an image processing system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of embodiments of the present invention.

In the following description, numerous specific details are given to provide a thorough understanding of the invention. However, it will be apparent that the invention may be practiced without these specific details. In order to avoid obscuring the embodiments of the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS.

The term "module" referred to herein can include software, hardware, or a combination thereof in the embodiments of the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Referring now to FIG. 1, therein is shown an example of a hardware block diagram of an image processing system 100 in an embodiment of the present invention. The image processing system 100 can be used to acquire, store, compute, communicate, and display information including images and videos.

The image processing system 100 can include a hardware structure implemented with any number of hardware units including network interfaces 102, a memory 104, a processor 106, input/output devices 108, a bus 110, and a storage device 112. An example of the network interfaces 102 can include a network card connected to an Ethernet or other types of local area networks (LAN). As a specific example, the LAN can include Bluetooth, Near Field Communication (NFC), wireless LAN, Long-Term Evolution (LTE), third Generation (3G), and Enhanced Data rates for GSM Evolution (EDGE).

The memory 104 can include any computer memory types. The processor 106 can include any processing unit with sufficient speed chosen for data control and computation operations of the hardware units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and solid state or flash memory. The storage device 112 and the memory 104 and can be used to store data for processed by any of the units in the image processing system 100.

The image processing system 100 can include functions for image processing of the images and the videos. The image processing functions can be implemented with hardware, software, or any combination thereof. The image processing system 100 can include an image signal processing hardware 114 and an image signal processing application unit 116.

The image signal processing hardware 114 can include any hardware units for processing images including dedicated circuitry, a processor, an integrated circuit, and integrated circuit cores. The image signal processing application unit 116 can include software including machine code, firmware, embedded code, or application software.

The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a cellular phone, a digital camera, a digital camcorder, a camera phone, a music player, a multimedia player, a video player, a DVD writer/player, a television, a home entertainment system, or any other computing devices. As a specific example, the computing devices can include Cyber-shot® cameras, CMOS sensor Digital Still Cameras (DSC), Handycam camcorders, and single-lens reflex (SLR) cameras. As another specific example, the computing devices can include Point-and-shoot cameras, video camcorders, single-lens reflex (SLR) cameras, mirrorless cameras, and cameras in mobile devices.

The input/output devices 108 can include a capture device 117. For example, the capture device 117 can be used to capture video. The input/output devices 108 can also include display devices 118 to display image information. The display devices 118 are units that present visual representations of images or any visual information. The display devices 118 can utilize a variety of display technologies such as LCD, LED-LCD, plasma, holographic, OLED, front and rear projections, CRT, or other display technologies.

The video captured by the capture device 117 can be considered as a series of images, which can further be broken down into input image blocks, for example. The capture device 117 is shown as connected to the processor 106 and the image signal processing hardware 114, but it is understood that the capture device 117 can be separate from the processor 106. In addition, the processor 106 can be physically separate from the display devices 118. The capture device 117, the processor 106, and the display devices 118 can all be connected physically or wirelessly, through the network interfaces 102, for example, as required by usage patterns.

For example, the capture device 117 can be a video camera capable of a wired or wireless connection to a display device having the processor 106 and the display devices 118. As another example, the capture device 117 and certain subunits of the image signal processing hardware 114 can be contained within a camera capable of wired or wireless connection to a display device having the remaining subunits of the image signal processing hardware 114 and the display devices 118, which can display resulting video.

Regardless of how the capture device 117, the processor 106, and the display devices 118 are connected, the display devices 118 can output decoded image blocks as decoded video after processing of the input image blocks by the image signal processing hardware 114. The quality of the resulting video can be determined by the particular compression scheme used when transmitting image block data, for example.

The image processing system 100 can include a system with a low-complexity embedded wavelet coder using a binary decomposition of bitplanes. In the embodiments of the present invention, a wavelet-based embedded coder-decoder (codec) with low complexity is proposed. The proposed codec works on one-dimensional (1-D) luminance-chroma (YUV) image blocks. The proposed codec is based on bit-plane coding in a wavelet domain through grouping zeroes together and coding them with short codes.

Then, non-zero partitions of size 4 bits are coded using variable-length code (VLC) tables for luma and chroma components. This codec has been optimized for small 1-D blocks to be implemented in hardware including large-scale integration (LSI) components.

The image processing system 100 can be applied to image codec, image processing, or video processing. For example, the image processing system 100 can be implemented for 4K televisions (TV). As a specific example, the image processing system 100 can be implemented in Sony BRAVIA™ LCD TVs, Sony digital still cameras (DSC), or Sony Handycam camcorders.

The embodiments of the present invention include a low-complexity coding algorithm that provides visually lossless compression for images and videos in order to reduce bandwidths demands of various image processing modules and memory. It can be implemented in LSI as a module in system on a chip (SOC).

There is another wavelet-based approach developed in Sony products, which is optimized only at low compression ratios of 50% or 4 bits/sample (bps) for 8-bit input images. The proposed codec, however, provides more efficient performance at higher compression ratios or target rates lower than 4 bps, compared to differential pulse-code modulation (DPCM) based approach only at low compression rates of 50% or lower.

The low-complexity coding algorithm can be implemented in LSI for memory and bus bandwidth reduction in electronic devices that work with digital images and videos. For example, the electronic devices can include digital still images, video cameras, TVs, cellphones, and High-Definition Multimedia Interface (HDMI) or Mobile High-Definition Link (MHL) standards.

Figure 2:
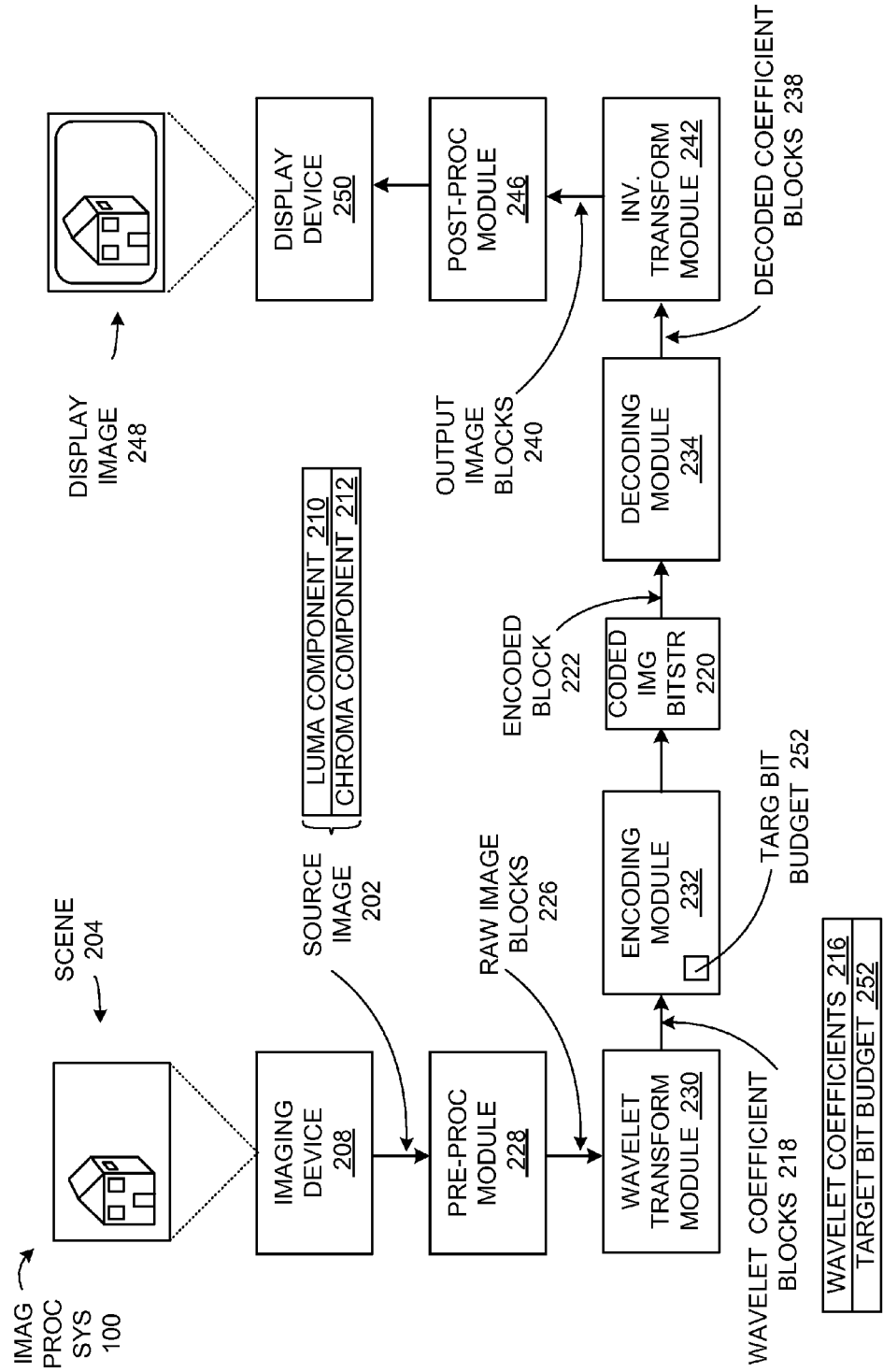
FIG. 2 is a functional block diagram of the image processing system.

Referring now to FIG. 2, therein is shown a functional block diagram of the image processing system 100. The image processing system 100 can encode and decode image information.

An imaging device 208 can form a source image 202 from a scene 204. The imaging device 208 is a device for capturing image data to form the source image 202.

The source image 202 is a digital representation of the scene 204. The source image 202 can be a digital image. The source image 202 can be formatted with a color model such as luminance-chroma (YUV), Red-Green-Blue (RGB), Cyan-Magenta-Yellow-Key (CMYK), or a similar color model.

For example, the source image 202 can be represented using the YUV color model. The source image 202 can have a luma component 210 and a chroma component 212, such as a first chroma component and a second chroma component.

A pre-processing module 228 can partition the source image 202 into raw image blocks 226 for easier processing. Each of the raw image blocks 226 can be extracted from the source image 202. The raw image blocks 226 form a subset of the source image 202. For example, the raw image blocks 226 can be a 2-dimensional 32×1 groups of pixels.

The raw image blocks 226 can be extracted from the source image 202 in a non-sequential manner. The raw image blocks 226 of the source image 202 can be accessed and processed in a random access manner because each of the raw image blocks 226 is processed independently.

A wavelet transform module 230 can apply a transform to each of the raw image blocks 226. For example, the wavelet transform module 230 can perform a wavelet transform, such as a Daubechies 5/3 integer wavelet transform, on each of the raw image blocks 226 to calculate wavelet coefficients 216 to form wavelet coefficient blocks 218. The wavelet coefficient blocks 218 are the binary representation of the wavelet coefficients 216 representing a wavelet transform of the raw image blocks 226.

An encoding module 232 can receive and encode the wavelet coefficient blocks 218 to form an encoded block 222 for a coded image bitstream 220. The encoded block 222 is computationally modified data representing one of the wavelet coefficient blocks 218. The coded image bitstream 220 is a digital representation of the wavelet coefficient blocks 218 of the source image 202.

Encoding is defined as computationally modifying a representation of an image to a different form. For example, encoding can compress the wavelet coefficient blocks 218 into the encoded block 222 for inserting into the coded image bitstream 220 to reduce the amount of data needed to transmit the coded image bitstream 220.

The encoding module 232 can encode the source image 202 to form the encoded block 222 by compressing the wavelet coefficient blocks 218. For example, the coded image bitstream 220 can be a bit sequence having the encoded block 222 and representing a compression of the source image 202.

The encoding module 232 can be implemented in a variety of ways. For example, the encoding module 232 can be implemented using hardware, software, or a combination thereof. For example, the encoding module 232 can be implemented with custom circuitry, a digital signal processor, microprocessor, integrated circuits, or a combination thereof.

The encoding process can be configured with a target bit budget 252. The target bit budget 252 is a number of bits allowed for the compressed version of the wavelet coefficient blocks 218. For example, if the target bit rate for transmission to the coded image bitstream 220 is 4 blocks per second, then the target bit budget 252 can be 32 times 4 for 128 bits for a one-color block of size 32×1. If the wavelet coefficient blocks 218 have an 8-bit depth, then this is equivalent to a 50% compression ratio.

In an illustrative example, the coded image bitstream 220 can be a serial bitstream sent from the encoding module 232 to a decoding module 234. In another illustrative example, the coded image bitstream 220 can be a data file stored on a storage device and retrieved for use by the decoding module 234.

In an illustrative example, the coded image bitstream 220 can be a serial bitstream sent from the encoding module 232 to a further module. Alternatively, the coded image bitstream 220 can be stored as a digital file on a storage device for decoding at a later time.

The decoding module 234 can receive and decode the coded image bitstream 220 to form decoded coefficient blocks 238. The decoded coefficient blocks 238 are a representation of the wavelet coefficient blocks 218.

The decoding module 234 can extract the encoded block 222 from the coded image bitstream 220 and form the decoded coefficient blocks 238. Decoding is defined as computationally modifying the coded image bitstream 220 to form the decoded coefficient blocks 238.

The decoding module 234 can be implemented in a variety of ways. For example, the decoding module 234 can be implemented using hardware, software, or a combination thereof. For example, the decoding module 234 can be implemented with custom circuitry, a digital signal processor, microprocessor, integrated circuits, or a combination thereof.

An inverse transform module 242 can receive the decoded coefficient blocks 238 and apply an inverse wavelet transform operation to form output image blocks 240. The inverse wavelet transform operation can convert the wavelet coefficients 216 back into the output image blocks 240. The output image blocks 240 are representations of the raw image blocks 226 of the source image 202 after the wavelet transformation, coding, decoding, and inverse wavelet transformation.

A post processing module 246 can receive the output image blocks 240 from the inverse transform module 242 for assembly into a display image 248. The display image 248 is a representation of the source image 202. For example, the post processing module 246 can receive the output image blocks 240, such as 32×1 groups of pixels, and combine them in order to form the display image 248.

A display device 250 can receive the display image 248 from the post processing module 246 for presentation on a display device. For example, the display device 250 can present the display image 248 on a monitor, a flat panel display, a television screen, a camera display, a smart phone, or a similar display device.

The modules can be implemented in hardware or software. For example, the modules can be implemented as electronic circuitry, such as integrated circuits, discrete circuit, or a combination thereof In another example, the modules can be implemented in software, such as software running on a dedicated processor, a microprocessor, co-processor, or a combination thereof.

The imaging device 208 can be implemented using the network interfaces 102 of FIG. 1, the memory 104 of FIG. 1, the processor 106 of FIG. 1, the input/output devices 108 of FIG. 1, the bus 110 of FIG. 1, the storage device 112 of FIG. 1, the image signal processing hardware 114 of FIG. 1, the image signal processing application unit 116 of FIG. 1, the capture device 117 of FIG. 1, or a combination thereof. The pre-processing module 228 or the wavelet transform module 230 can be implemented using the network interfaces 102, the memory 104, the processor 106, the input/output devices 108, the bus 110, the storage device 112, the image signal processing hardware 114, the image signal processing application unit 116, or a combination thereof.

The encoding module 232 or the decoding module 234 can be implemented using the network interfaces 102, the memory 104, the processor 106, the input/output devices 108, the bus 110, the storage device 112, the image signal processing hardware 114, the image signal processing application unit 116, or a combination thereof. The inverse transform module 242, the post processing module 246, or the display device 250 can be implemented using the network interfaces 102, the memory 104, the processor 106, the input/output devices 108, the bus 110, the storage device 112, the image signal processing hardware 114, the image signal processing application unit 116, or a combination thereof.

The imaging device 208 can be coupled to the pre-processing module 228. The pre-processing module 228 can be coupled to the wavelet transform module 230. The wavelet transform module 230 can be coupled to the encoding module 232. The encoding module 232 can be coupled to the decoding module 234. The decoding module 234 can be coupled to the inverse transform module 242. The inverse transform module 242 can be coupled to the post processing module 246. The post processing module 246 can be coupled to the display device 250.

It has been discovered that accessing the raw image blocks 226 of the source image 202 in a random access manner increases flexibility and computational performance. Because each of the raw image blocks 226 is coded independently of other blocks, there are no limitations on data access and computational parallelism.

Referring now to FIG. 3, therein is shown an example of the wavelet coefficients 216. The wavelet coefficients 216 form a representation of one of the raw image blocks 226 of the source image 202 of FIG. 2.

The wavelet coefficients 216 can be calculated by performing a wavelet transform on each of the pixel values of one of the raw image blocks 226. The wavelet coefficients 216 can represent time and frequency transforms of the raw image blocks 226.

In an illustrative example, one of the raw image blocks 226 can be represented by the values denoted by "x". There is one of the x values for each of the 32 pixels of each of the raw image blocks 226.

The wavelet coefficients 216 can be calculated by applying the wavelet transform operation on the x values of the raw image blocks 226. The pixels of the raw image blocks 226 can be represented by 32 of the wavelet coefficients 216.

For example, at each level of the Daubechies 5/3 integer wavelet transform, lowpass ($Y_L$) and highpass ($Y_H$) subbands can be calculated with:

$$Y[2i] = X[2i] - \left\lfloor \frac{X[2i-1] + X[2i+1]}{2} \right\rfloor \quad (1)$$

for $$0 \leq i \leq 16$$

$$Y_H = Y[2i+1] = X[2i+1] + \left\lfloor \frac{Y[2i] + Y[2i+2] + 2}{4} \right\rfloor \quad (2)$$

for $$0 \leq i$$

$$Y_L = Y[2i]|_{i=1,\ldots,15} \quad (3)$$

Here, X[i] are pixel values of the raw image blocks 226 in FIG. 3 with index i. X[−1]=X[3] and X[0]=X[2] can be obtained by symmetric extension of the raw image blocks 226. For the next level of the wavelet transform, this process can be iterated on the lowpass subband $Y_L$ of the previous level. FIG. 3 shows an example of wavelets with 3 levels.

The wavelet coefficients 216 can be allocated to different subbands. Three levels of wavelets can be used. For example, the wavelet coefficients 216 can be calculated for a lowpass subband 306, a third highpass subband 308, a second highpass subband 310, and a first highpass subband 312. Each of the subbands represents a time and frequency range for the wavelet coefficients 216. The wavelet coefficients can be calculated for the lowpass subband 306, the third highpass subband 308, the second highpass subband 310, and the first highpass subband 312 as previously described in Equations 1-3.

Referring now to FIG. 4, therein is shown an example of one of the wavelet coefficient blocks 218. The wavelet coefficient blocks 218 are the wavelet coefficients 216 represented in binary. The wavelet coefficients 216 are a time and frequency transformation of the raw image blocks 226 of FIG. 2.

Each of the wavelet coefficient blocks 218 includes representations of bitplanes of the wavelet coefficients 216. Each of wavelet bitplanes 408 represents all bits 409 at a particular bit depth of binary values representing the wavelet coefficients 216.

The wavelet coefficient blocks 218 can include a current bitplane 402, a most significant bitplane 404, and a least significant bitplane 406. Each of the current bitplane 402, the most significant bitplane 404, and the least significant bitplane 406 represents the bits 409 at a particular bit depth of the wavelet coefficients 216 of the wavelet coefficient blocks 218.

The current bitplane 402 represents data of a bitplane being coded or decoded. The most significant bitplane 404 can represent the highest binary bit value of one of the wavelet coefficients 216. The least significant bitplane 406 can represent the lowest binary bit value of one of the wavelet coefficients 216.

Each of the wavelet bitplanes 408 can include an index position 411. For example, the index position 411 can range between 1 and 32. The index position 411 represents the location of one of the wavelet coefficients 216 in one of the wavelet coefficient blocks 218.

A higher bitplane 410 is a bitplane that has a greater bitplane value than the current bitplane 402. A lower bitplane 412 is a bitplane having a lower bitplane value than the current bitplane 402.

The wavelet coefficients 216 of the wavelet coefficient blocks 218 are allocated to different subbands representing time and frequency values. For example, the first four elements of each of the wavelet bitplanes 408 are allocated to the lowpass subband 306 of FIG. 3.

Figure 5:
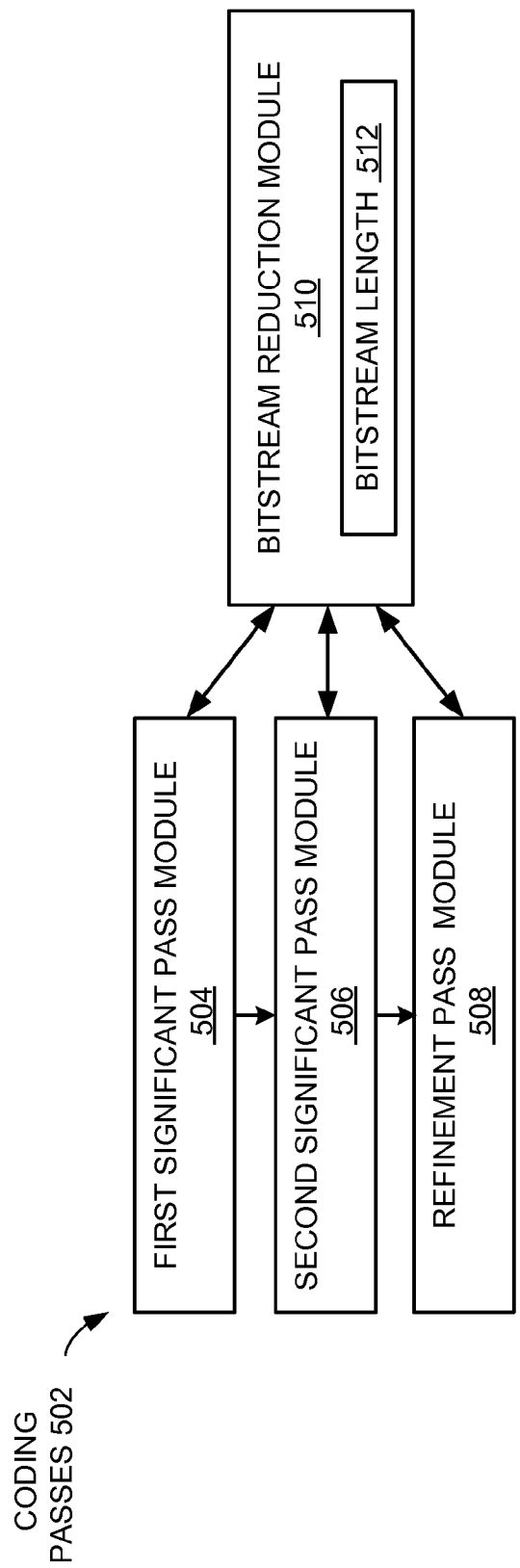
FIG. 5 is an example of coding passes.

Referring now to FIG. 5, therein is shown an example of coding passes 502. The coding passes 502 can perform three passes through the data to encode entirety of the source image 202 of FIG. 2. The coding passes 502 can include a first significant pass module 504, a second significant pass module 506, and a refinement pass module 508.

Embodiments of the proposed innovation limit a maximum bitstream length of these codecs in each significant pass or each of the coding passes 502. For example, the coding passes 502 can include wavelet-based or discrete cosine transform-based (DCT-based) bitplane coding schemes.

As a specific example, the coding schemes can include the binary decomposition codec (BDC) described in the concurrently filed U.S. patent application entitled "IMAGE PROCESSING SYSTEM WITH BINARY DECOMPOSITION AND METHOD OF OPERATION THEREOF". As another specific example, the coding schemes can include the binary adaptive Golomb (BAG) codec described in the concurrently filed U.S. patent application entitled "IMAGE PROCESSING SYSTEM WITH WAVELET BASED GOLOMB CODING AND METHOD OF OPERATION THEREOF".

The first significant pass module 504 can pre-process the current bitplane 402 of FIG. 4 of each of the wavelet coefficient blocks 218 of FIG. 2. The first significant pass module 504 can detect the bits 409 of FIG. 4 that have a value of 1 and flag them as significant.

The second significant pass module 506 can encode the data from the current bitplane 402 using a run-length encoding together with other entropy coding techniques to compress the data. For example, the second significant pass module 506 can employ a Golomb code to encode the bits 409 of the wavelet coefficient blocks 218.

The refinement pass module 508 can store bit values at the current bitplane 402 of the wavelet coefficients 216 of FIG. 2 marked for refinement, by coefficient significance vectors (CSV), to the coded image bitstream 220 of FIG. 2. In embodiments of the innovation used in the image processing system 100 of FIG. 1, a wavelet-based bitplane coding technique is proposed for YUV images or images with other formats with the following specifications. The wavelet-based bitplane coding technique can include low-complexity coding algorithms designed for 1-D image blocks.

At a not very high rate, the wavelet-based bitplane coding technique can provide visually lossless compression of images at a predetermined compression rate. The predetermined compression rate can be 3 bits per second (bps) or less. The wavelet-based bitplane coding technique can provide a random access. In other words, the blocks can be coded independently.

The wavelet-based bitplane coding technique can include three of the coding passes 502 using the first significant pass module 504, the second significant pass module 506, and the refinement pass module 508. The three coding passes can be used for a binary decomposition coder-decoder (codec), denoted as BDC, or a binary adaptive Golomb (BAG) codec.

The image processing system 100 can include a bitstream reduction module 510 interfacing with the first significant pass module 504, the second significant pass module 506, and the refinement pass module 508. The bitstream reduction module 510 communicates with the first significant pass module 504, the second significant pass module 506, and the refinement pass module 508 to reduce a bitstream length 512 of the coded image bitstream 220. The bitstream reduction module 510 will be subsequently described in more details.

The first significant pass module 504, the second significant pass module 506, the refinement pass module 508, and the bitstream reduction module 510 can be implemented in the encoding module 232 of FIG. 2 to code the coded image bitstream 220. Operations inverse to operations of the first significant pass module 504, the second significant pass module 506, the refinement pass module 508, and the bitstream reduction module 510 can be implemented in the decoding module 234 of FIG. 2 to decode the coded image bitstream 220.

The first significant pass module 504 can be coupled to the second significant pass module 506 and the bitstream reduction module 510. The second significant pass module 506 can be coupled to the refinement pass module 508 and the bitstream reduction module 510. The refinement pass module 508 can be coupled to the bitstream reduction module 510.

Figure 6:
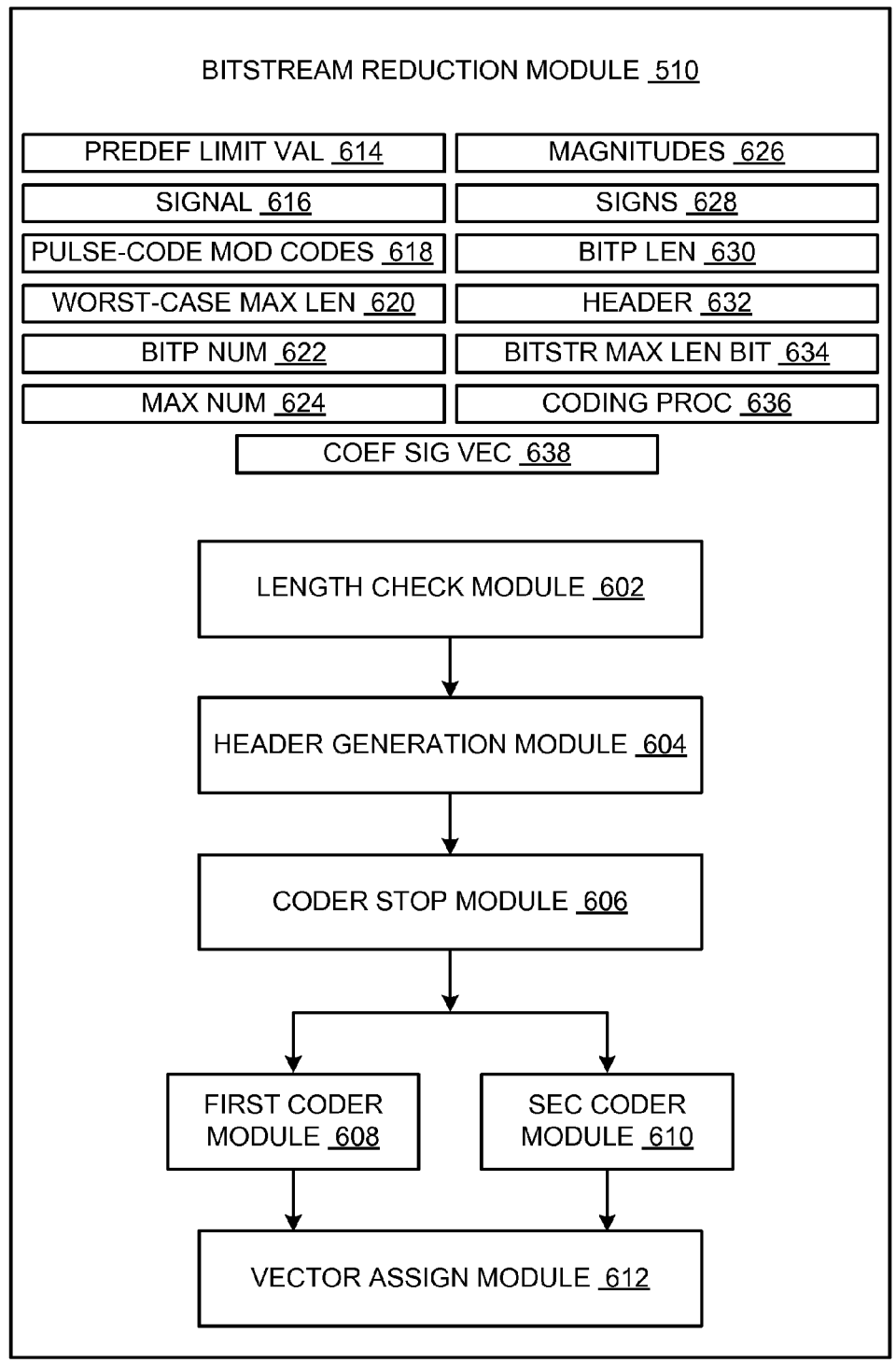
FIG. 6 is a detailed flow chart of the bitstream reduction module.

Referring now to FIG. 6, therein is shown a detailed flow chart of the bitstream reduction module 510. The bitstream reduction module 510 can include a length check module 602, a header generation module 604, a coder stop module 606, a first coder module 608, a second coder module 610, and a vector assignment module 612. The bitstream reduction module 510 provides a simple approach for maximum bitstream size reduction of low-complexity embedded wavelet codecs.

A technique has been proposed in the embodiments to reduce a complexity of wavelet-based bitplane coding techniques for hardware implementation. For example, the wavelet-based bitplane coding techniques can include BAG and BDC.

The bitstream reduction module 510 can limit the bitstream length 512 of FIG. 5 in each significant coding pass or each of the coding passes 502 of FIG. 5. The bitstream length 512 can be limited to a predefined limit value 614. The predefined limit value 614 is a numerical value determined and to be set or assigned prior to operation of the image processing system 100 of FIG. 1.

A signal 616 has been proposed in the bitstream reduction module 510 to identify a condition when the bitstream length 512 in one of the coding passes 502 for one of the wavelet bitplanes 408 of FIG. 4 goes or exceeds beyond the predefined limit value 614. For example, the one of the coding passes 502 can include the first significant pass module 504 of FIG. 5 or the second significant pass module 506 of FIG. 5. If the condition occurs, the one of the wavelet bitplanes 408 can be coded by generating pulse-code modulation codes 618, denoted as PCM codes.

In low-complexity wavelet-based bitplane coding schemes, it is important to reduce hardware complexity. A worst-case maximum length 620 of the encoded block 222 of FIG. 2 to be sent in the coded image bitstream 220 of FIG. 2 at one of the wavelet bitplanes 408 having a bitplane number 622, denoted as n, can play a key role in reducing hardware complexity. For example, the worst-case maximum length 620 can be applicable to coding methods for each significant pass of a system having a low-complexity embedded wavelet coder using binary decomposition of bitplanes or based on binary adaptive Golomb coding of partitions.

In the embodiments of the innovation, it has been proposed to limit the worst-case maximum length 620 of the encoded block 222 for each significant pass or each of the coding passes 502 to the predefined limit value 614. The coding passes 502 can include the first significant pass module 504 and the second significant pass module 506.

The predefined limit value 614 can be set to a maximum number 624 of bits to be used to code the wavelet bitplanes 408 for each of the coding passes 502. The maximum number 624 is a numerical value in a number of bits for coding all magnitudes 626 of the wavelet coefficients bits at the current bitplane 402 of FIG. 4 and all signs 628 of the wavelet coefficients 216 of FIG. 2 in the wavelet bitplanes 408.

The magnitudes 626 are absolute values of the wavelet coefficients 216. The signs 628 indicate whether non-zero numerical values of the wavelet coefficients 216 are negative or positive. For example, each of the signs 628 can be coded such that a binary value of 0 or 1 indicates that one of the wavelet coefficients 216 is negative or positive, respectively.

A bitplane or one of the wavelet bitplanes 408 can include a bitplane length 630, denoted as N. As an example, for the bitplane, the predefined limit value 614, denoted by M here, can be set to the maximum number 624 of 2N, which includes all bits of the wavelet coefficients 216 at the current bitplane 402 and the signs 628 of the wavelet coefficients 216. It also can be adaptively set to M=2$K_1$ for the significant pass 1 and M=2$K_2$ for the significant pass 2. $K_1$ and $K_2$ are numbers of bits for a PCM coding to code a bitplane at significant pass 1 or significant pass 2, respectively. These values are defined later.

To realize or implement the embodiments, during bitplane coding of the wavelet bitplanes 408, the bitstream length 512 can be checked for each significant pass or each of the coding passes 502 by the length check module 602. If the bitstream length 512 exceeds the predefined limit value 614, the header generation module 604 generates and sends a header 632 in the encoded block 222. The header 632 can include a number of header bits, which are binary values.

One of the header bits can include a bitstream maximum length bit 634, denoted as bitstream_MaxLength. The bitstream maximum length bit 634 is a 1-bit binary value used to signal or indicate that the bitstream length 512 exceeds the predefined limit value 614. This binary value can be followed by a number showing the bitplane number 622 and the corresponding significant pass that the PCM coding is invoked.

If the bitstream length 512 exceeds the predefined limit value 614, the coder stop module 606 interfaces with one of the coding passes 502 and instruct the one of the coding passes 502 to stop or halt a coding process 636 of the current bitplane 402. The coding process 636 is a method of reducing an amount of information without loss of the information. For example, the coding passes 502 can include the first significant pass module 504 and the second significant pass module 506.

If the coding process 636 is stopped at the second significant pass module 506, the first coder module 608 can code only the bits 409 of FIG. 4 and the signs 628 associated with the bits 409 that are not coded in the first significant pass module 504 and are not part of or not coded in the refinement pass module 508 of FIG. 5. For example, coefficient bits with CSV[i]≠2, or 3, i∈$K_2$ before starting the significant pass 2 can be coded by a PCM module. Here, $K_2$ denotes a number of insignificant coefficients (or CSV[i]=0, or 1) before starting significant pass 2. The first coder module 608 can use a PCM coding method to generate the pulse-code modulation codes 618 for the bits 409 and the signs 628 associated with the bits 409. The pulse-code modulation codes 618 can be sent in the encoded block 222.

If the coding process 636 is stopped at the first significant pass module 504, the second coder module 610 can code only the bits 409 and the signs 628 associated with the bits 409 that are not in or not to be processed by the refinement pass module 508. For example, coefficient bits with CSV[i]≠2, i∈$K_1$ before starting the significant pass 1 can be coded by the PCM module. Here, $K_1$ denotes a number of insignificant coefficients (or CSV[i]=0, or 1) before starting significant pass 1. The second coder module 610 can use the PCM coding method to generate the pulse-code modulation codes 618 for the bits 409 and the signs 628 associated with the bits 409. The pulse-code modulation codes 618 can be sent in the encoded block 222.

Then, all of the wavelet coefficients 216 previously coded as the pulse-code modulation codes 618 can be added as significant by the vector assignment module 612 so that they can be processed by the refinement pass module 508 for the next wavelet bitplanes. The wavelet coefficients 216 coded as the pulse-code modulation codes 618 can be added as significant by setting a coefficient significance vector 638, denoted as CSV, using Equation 4 below. Here, K=$K_1$ or $K_2$ denotes a number of bits to be coded as the PCM codes 618.

$$CSV[i]=3, i \in K \qquad (4)$$

The coefficient significance vector 638 is information about significance of the wavelet coefficients 216. The wavelet coefficients 216 are significant at one of the wavelet bitplanes 408 with the bitplane number 622, denoted as n, if the wavelet coefficients 216 include a binary value of 1 at the higher bitplane 410 of FIG. 4 with the bitplane number 622, denoted as $n_1$, where $n_1 > n$.

The coefficient significance vector 638 can include four values below.

0: an initial value
1: an insignificant wavelet coefficient
2: a significant wavelet coefficient
3: a wavelet coefficient that just became significant in a current bitplane The coefficient significance vector 638 having a value of 0 indicates that the coefficient significance vector 638 includes an initial value. The coefficient significance vector 638 having a value of 1 indicates that one of the wavelet coefficients 216 is insignificant. The coefficient significance vector 638 having a value of 2 indicates that one of the wavelet coefficients 216 is significant. The coefficient significance vector 638 having a value of 3 indicates that one of the wavelet coefficients 216 just became significant in the current bitplane 402.

In the description above, the bits 409 that are coded or not coded in the first significant pass module 504 or the refinement pass module 508 can be determined based on the coefficient significance vector 638. For example, the first significant pass module 504 can be coded based on the coefficient significance vector 638 having a numerical value of 1 when the wavelet coefficients 216 at one of the wavelet bitplanes 408 are insignificant.

Also for example, the refinement pass module 508 can be coded based on the coefficient significance vector 638 having a numerical value of 2 when the wavelet coefficients 216 at one of the wavelet bitplanes 408 are significant. Further, for example, the refinement pass module 508 can be coded based on the coefficient significance vector 638 having a numerical value of 3 when the wavelet coefficients 216 just became significant in the current bitplane 402.

It has been noted that once the condition above happens for a bitplane or one of the wavelet bitplanes 408, the rest of the bits 409 can be coded by the refinement pass module 508. Therefore, for other bitplanes, which are the wavelet bitplanes 408 having the bitplane number 622 higher than the bitplane number 622 of the current bitplane 402, the bitstream length 512 does not reach the worst-case maximum length 620.

At a decoder or the decoding module 234 of FIG. 2, before decoding each significant pass, the decoding module 234 can check the header 632 and decide or determine if a PCM decoding method needs to be used. The decoding module 234 can use the PCM decoding method by checking the bitstream maximum length bit 634 in the header 632.

Functions or operations of the image processing system 100 described above can be implemented using modules. The functions or the operations of the image processing system 100 can be implemented in hardware, software, or a combination thereof.

The image processing system 100 is described with module functions or order as an example. The modules can be partitioned differently. Each of the modules can operate individually and independently of the other modules. Furthermore, data generated in one module can be used by another module without being directly coupled to each other.

The physical transformation of generating the coded image bitstream 220 based on the header 632 for decoding into the display image 248 of FIG. 2 to display on the display device 250 of FIG. 2 results in movement in the physical world, such as people using the encoding module 232 of FIG. 2 and the decoding module 234 based on the operation of the image processing system 100. As the movement in the physical world occurs, the movement itself creates additional information that is converted back to the raw image blocks 226 of FIG. 2 from the imaging device 208 of FIG. 2 to generate the header 632 in the encoded block 222 based on the bitstream length 512 for the continued operation of the image processing system 100 and to continue the movement in the physical world.

It has been discovered that the header 632 generated in the encoded block 222 based on the bitstream length 512 reduces the bitstream length 512 thereby reduces hardware complexity.

It has also been discovered that the header 632 having the bitstream maximum length bit 634 reduces the bitstream length 512 thereby improves overall system performance.

It has further been discovered that the header 632 generated when the bitstream length 512 exceeds the predefined limit value 614 reduces the bitstream length 512 and thus improves overall system performance. The predefined limit value 614 of a number of bits is used for coding magnitudes of the bits 409 at the current bitplane 402 and the signs 628 of the wavelet coefficients 216 in the wavelet coefficient blocks 218 of FIG. 2.

It has further been discovered that the coding process 636 of the coding passes 502 stopped based on the bitstream length 512 reduces the bitstream length 512 thereby reduces hardware complexity.

It has further been discovered that the bits 409 of the wavelet coefficient blocks 218 and the signs 628 associated with the bits 409 reduce the bitstream length 512 thereby reduce hardware complexity. The bits 409 are not coded in the first significant pass module 504 or the refinement pass module 508, and the coding process 636 is stopped in the second significant pass module 506 or the first significant pass module 504.

It has further been discovered that the pulse-code modulation codes 618 generated for the wavelet bitplanes 408 based on the bitstream length 512 in the coding passes 502 reduce the bitstream length 512 thereby improve overall system performance.

It has further been discovered that the coefficient significance vector 638 set for the pulse-code modulation codes 618 allows the coding process 636 to generate the coded image bitstream 220 with reduction of the bitstream length 512 thereby reduces hardware complexity.

Figure 7:
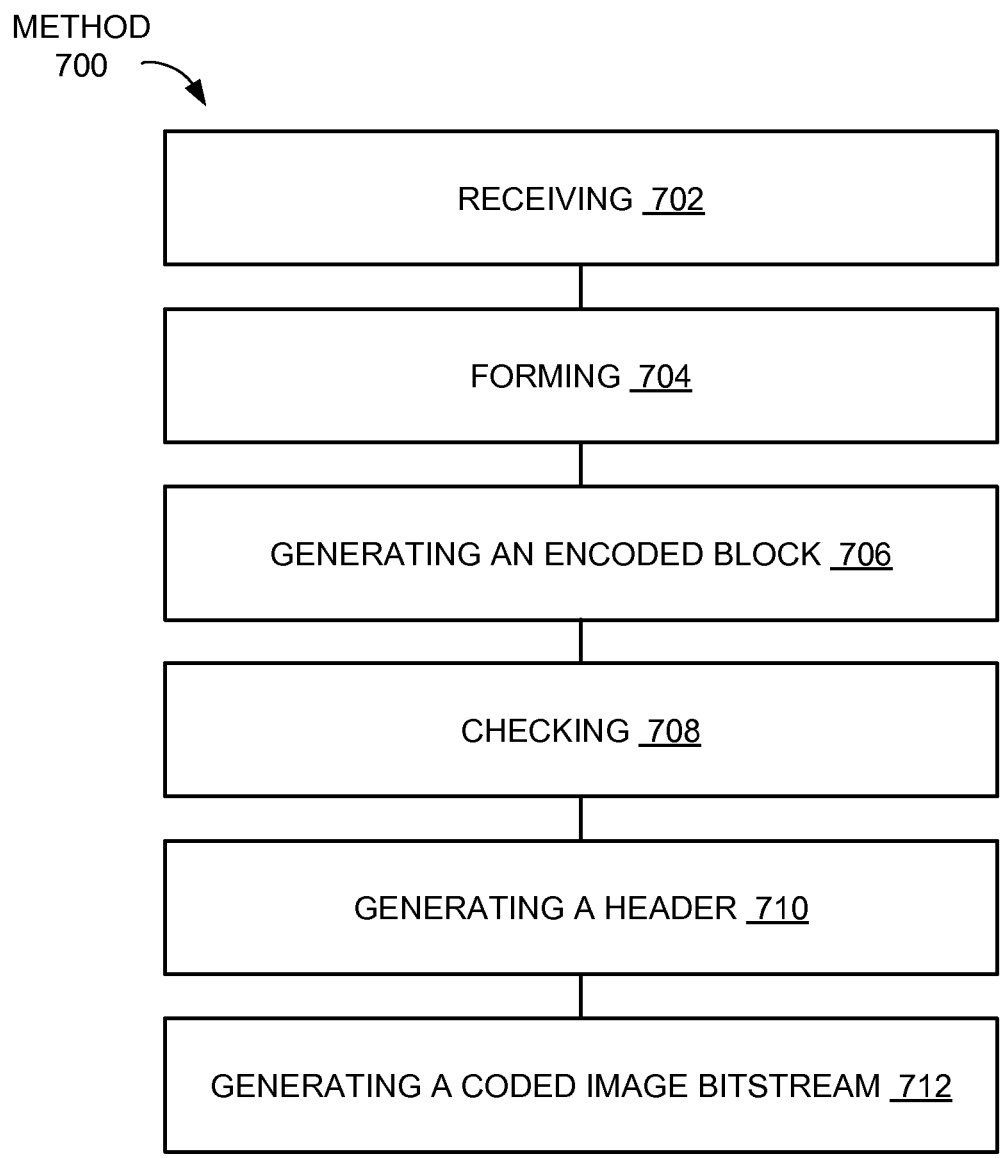
FIG. 7 is a flow chart of a method of operation of an image processing system in a further embodiment of the present invention.

Referring now to FIG. 7, therein is shown a flow chart of a method 700 of operation of an image processing system in a further embodiment of the present invention. The method 700 includes: receiving a raw image block of a source image from an imaging device in a block 702; forming a wavelet coefficient block by performing a wavelet transform operation on the raw image block in a block 704; generating an encoded block in a wavelet bitplane based on the wavelet coefficient block in a block 706; checking a bitstream length of the encoded block in a coding pass in a block 708; generating a header in the encoded block based on the bitstream length in a block 710; and generating a bitstream based on the header for decoding into a display image to display on a display device in a block 712.

Thus, it has been discovered that the image processing system 100 of FIG. 1 of the embodiments of the present invention furnish important and heretofore unknown and unavailable solutions, capabilities, and functional aspects for an image processing system with bitstream reduction. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the embodiments of the present invention is that it valuably supports and services the historical trend of reducing costs, simplifying systems, and increasing performance.

These and other valuable aspects of the embodiments of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   receiving a raw image block of a source image from an imaging device;
   forming a wavelet coefficient block by performing a wavelet transform operation on the raw image block;
   generating an encoded block in a wavelet bitplane based on the wavelet coefficient block;
   checking a bitstream length of the encoded block in a coding pass;
   generating a header in the encoded block, the header having a binary value of a bitstream maximum length bit, the bitstream maximum length bit generated based on the bitstream length; and
   generating a bitstream based on the header for decoding into a display image to display on a display device.

2. The method as claimed in claim 1 wherein generating the header includes generating the header having the bitstream maximum length bit for indicating when the bitstream length exceeds a predefined limit value of a number of bits for coding magnitudes of wavelet coefficients in the wavelet coefficient block at the wavelet bitplane.

3. The method as claimed in claim 1 further comprising:
   stopping a coding process of the coding pass based on the bitstream length; and
   coding a bit of the wavelet coefficient block, wherein the bit is not to be processed in another coding pass and the coding process is stopped in the coding pass.

4. The method as claimed in claim 1 further comprising:
   stopping a coding process of the coding pass based on the bitstream length; and
   coding a bit of the wavelet coefficient block, wherein the bit is not marked for refinement at the wavelet bitplane and the coding process is stopped in the coding pass, wherein the refinement is identified by a coefficient significance vector of the wavelet coefficient.

5. The method as claimed in claim 1 further comprising generating a pulse-code modulation code for the wavelet bitplane based on the bitstream length in the coding pass, wherein the bitstream length is checked and exceeds a predefined limit value.

6. A method of operation of an image processing system comprising:
   receiving a raw image block of a source image from an imaging device;
   forming a wavelet coefficient block by performing a wavelet transform operation on the raw image block;
   generating an encoded block in a wavelet bitplane based on the wavelet coefficient block;
   checking a bitstream length of the encoded block in a coding pass;
   generating a header in the encoded block, the header having a binary value of a bitstream maximum length bit, the bitstream maximum length bit generated based on the bitstream length for the wavelet bitplane; and
   generating a bitstream based on the header for decoding into a display image to display on a display device.

7. The method as claimed in claim 6 wherein generating the header includes generating the header having the bitstream maximum length bit for indicating when the bitstream length exceeds a predefined limit value of a number of bits for coding magnitudes and signs of wavelet coefficients in the wavelet coefficient block at the wavelet bitplane.

8. The method as claimed in claim 6 further comprising:
   stopping a coding process of the coding pass based on the bitstream length; and
   coding a bit of the wavelet coefficient block and a sign associated with the bit,
      wherein the bit is not to be processed in another coding pass and the coding process is stopped in the coding pass.

9. The method as claimed in claim 6 further comprising:
   stopping a coding process of the coding pass based on the bitstream length; and
   coding a bit of the wavelet coefficient block and a sign associated with the bit,
      wherein the bit is not marked for refinement at the wavelet bitplane and the coding process is stopped in the coding pass,
      wherein the refinement is identified by a coefficient significance vector for indicating significance of the wavelet coefficient.

10. The method as claimed in claim 6 further comprising:
    generating a pulse-code modulation code for the wavelet bitplane based on the bitstream length in the coding pass, wherein the bitstream length is checked and exceeds a predefined limit value; and
    setting a coefficient significance vector for the pulse-code modulation code.

11. An image processing system comprising:
    a pre-processing module for receiving a raw image block of a source image from an imaging device;
    a wavelet transform module, coupled to the pre-processing module, for forming a wavelet coefficient block by performing a wavelet transform operation on the raw image block; and
    an encoding module, coupled to the wavelet transform module, for generating an encoded block in a wavelet bitplane based on the wavelet coefficient block, for checking a bitstream length of the encoded block in a coding pass, for generating a header in the encoded block, the header having a binary value of a bitstream maximum length bit, the bitstream maximum length bit generated based on the bitstream length, and for generating a bitstream based on the header for decoding into a display image to display on a display device.

12. The system as claimed in claim 11 wherein the encoding module is for generating the header having the bitstream maximum length bit for indicating when the bitstream length exceeds a predefined limit value of a number of bits for coding magnitudes of wavelet coefficients in the wavelet coefficient block at the wavelet bitplane.

13. The system as claimed in claim 11 wherein the encoding module is for stopping a coding process of the coding pass based on the bitstream length and for coding a bit of the wavelet coefficient block, wherein the bit is not to be processed in another coding pass and the coding process is stopped in the coding pass.

14. The system as claimed in claim 11 wherein the encoding module is for stopping a coding process of the coding pass based on the bitstream length and for coding a bit of the wavelet coefficient block, wherein the bit is not marked for refinement at the wavelet bitplane and the coding process is stopped in the coding pass, wherein the refinement is identified by a coefficient significance vector of the wavelet coefficient.

15. The system as claimed in claim 11 wherein the encoding module is for generating a pulse-code modulation code for the wavelet bitplane based on the bitstream length in the coding pass, wherein the bitstream length is checked and exceeds a predefined limit value.

16. The system as claimed in claim 11 wherein the encoding module is for generating the header in the encoded block, the header having the bitstream maximum length bit generated based on the bitstream length for the wavelet bitplane.

17. The system as claimed in claim 16 wherein the encoding module is for generating the header having the bitstream maximum length bit for indicating when the bitstream length exceeds a predefined limit value of a number of bits for coding magnitudes and signs of wavelet coefficients in the wavelet coefficient block at the wavelet bitplane.

18. The system as claimed in claim 16 wherein the encoding module is for stopping a coding process of the coding pass based on the bitstream length and for coding a bit of the wavelet coefficient block and a sign associated with the bit, wherein the bit is not to be processed in another coding pass and the coding process is stopped in the coding pass.

19. The system as claimed in claim 16 wherein the encoding module is for stopping a coding process of the coding pass based on the bitstream length and for coding a bit of the wavelet coefficient block and a sign associated with the bit, wherein the bit is not marked for refinement at the wavelet bitplane and the coding process is stopped in the coding pass, wherein the refinement is identified by a coefficient significance vector for indicating significance of the wavelet coefficient.

20. The system as claimed in claim 16 wherein the encoding module is for generating a pulse-code modulation code for the wavelet bitplane based on the bitstream length in the coding pass, wherein the bitstream length is checked and exceeds a predefined limit value, and for setting a coefficient significance vector for the pulse-code modulation code.

\* \* \* \* \*